United States Patent [19]

Fortner et al.

[11] 4,191,548
[45] Mar. 4, 1980

[54] METHOD AND APPARATUS FOR FORMING GLASS CONTAINERS

[75] Inventors: John M. Fortner, Whitehouse; Richard T. Kirkman, Maumee, both of Ohio

[73] Assignee: Owens-Illinois, Inc., Toledo, Ohio

[21] Appl. No.: 906,707

[22] Filed: May 17, 1978

[51] Int. Cl.$^2$ .............................................. C03B 9/36
[52] U.S. Cl. ........................................ 65/79; 65/233; 65/234; 65/235
[58] Field of Search ................. 65/46, 79, 233, 234, 65/235

[56] References Cited

U.S. PATENT DOCUMENTS

| | | | |
|---|---|---|---|
| 1,840,532 | 1/1932 | Rowe | 65/76 |
| 1,911,119 | 5/1933 | Ingle | 65/219 |
| 3,171,732 | 3/1965 | Anderson | 65/234 X |
| 3,305,344 | 2/1967 | Colchagoff | 65/233 X |
| 3,598,561 | 8/1971 | Hamilton | 65/233 |
| 3,874,862 | 4/1975 | Bickling, Jr. et al. | 65/26 |

FOREIGN PATENT DOCUMENTS 128236 1/1968 Czechoslovakia .

*Primary Examiner*—Arthur D. Kellogg
*Attorney, Agent, or Firm*—D. T. Innis; Myron E. Click; David H. Wilson

[57] ABSTRACT

Method and apparatus for forming glass containers by the blow and blow process in which a parison mold and blow mold are positioned relative to each other, such that parisons can be transferred by an invert arm. The parisons are formed with their necks down in the parison mold from a charge of glass delivered thereto, and vacuum is applied to the neck mold to settle the molten glass in the neck mold about a special neck pin to thereby form the finish portion of the container. The neck pin is pulled and counterblow of the charge into parison form is accomplished and the parison is transferred from the parison mold to the blow mold where it is expanded into final shape. The parison mold is coated with a "solid film lubricant" which provides a surface that has an insulating effect and requires less "swabbing" over its useable life. A plunger that has a tip that produces less heat removal for the time it is in contact with the charge or gob of glass is used and purging of the vacuum passages in the plunger is carried out each cycle.

6 Claims, 7 Drawing Figures

FIG. 6
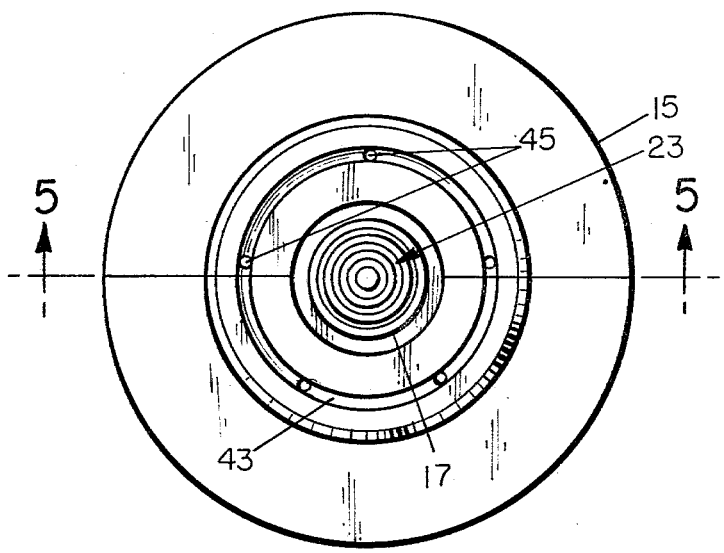
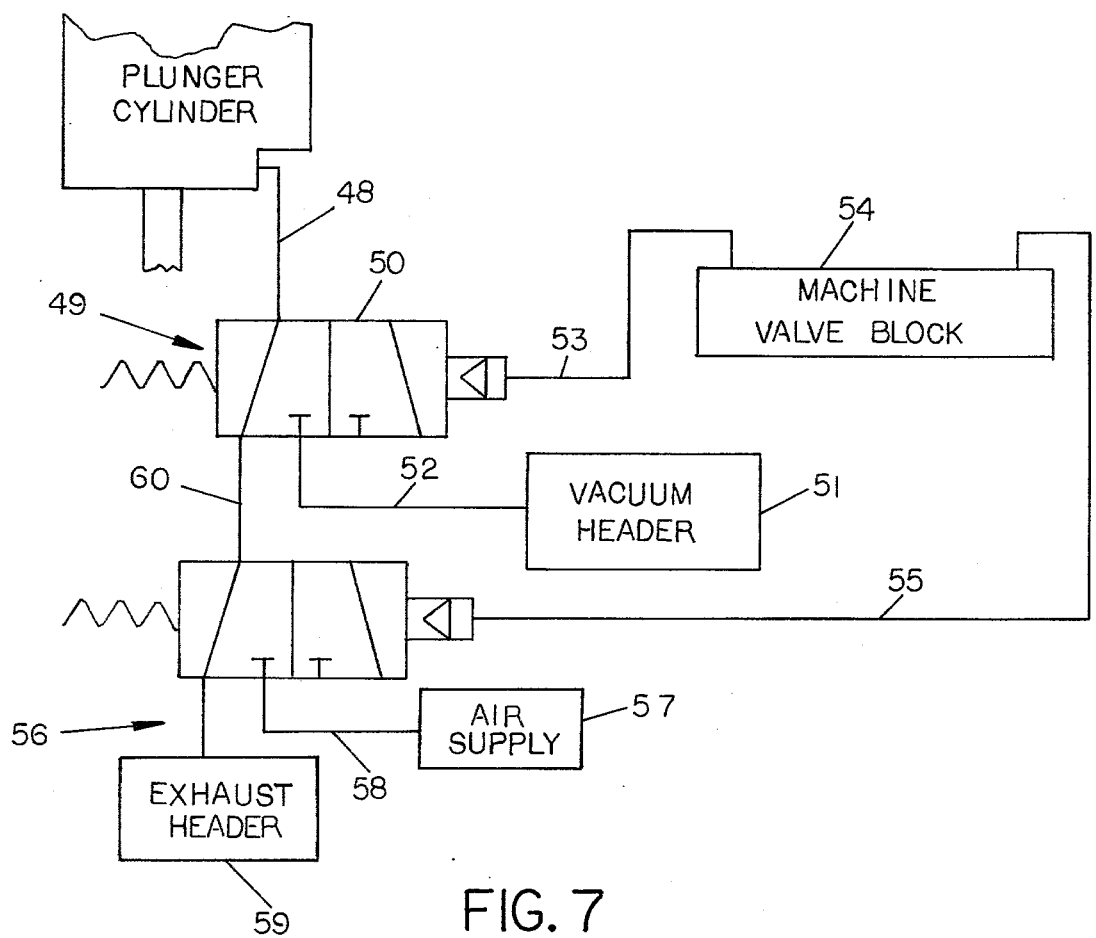
FIG. 7

METHOD AND APPARATUS FOR FORMING GLASS CONTAINERS

BACKGROUND OF THE INVENTION

This invention relates to the manufacture of blown glass articles such as bottles, jars, flasks, etc. According to the "narrow neck blow and blow", method presently used and as described in U.S. Pat. No. 1,911,119, a charge of glass is delivered to and compacted or caused to settle in the cavity of an inverted or neck-down, blank or parison mold. The glass of the charge will be extending from the neck portion of the mold cavity, part of the way up the sides thereof. A baffle is placed on the uppermost end of the inverted blank or parison mold and air under pressure is applied to the interior of the glass in the mold through the neck opening to counterblow such glass into conformity with the internal configuration of the blank or parison mold and against the baffle. Thereafter, the counterblown blank or parison is transferred to an upright final blow mold in which the blank or parison is disposed in an upright or neck-up position and air under pressure is applied to the interior thereof. The counterblown blank or parison is thus expanded to the configuration of the final blow mold cavity, thereby forming an article of the final shape and size desired.

This method of forming articles of glassware has been practices since the 1920's. Certain faults and shortcomings have been known and such defects as "settle waves" in the sidewalls of the article, marking the juncture of wall portions of two different thicknesses are common. Furthermore, articles of generally circular cross-sectional configuration have experienced the formation of excessively thick shoulders and relatively thin bottoms when produced by the above-described method. Those articles which would have a generally rectangular cross-sectional configuration or are of a flask shape usually have excessively thick sides or panels and relatively thin corner sections. As a matter of fact, different portions of practically all articles produced by the aforementioned method vary substantially in the thickness of the walls thereof. Therefore, for most articles of a given size and intended use, it has been necessary to use a glass charge of undue size and weight so as to insure that the article produced will be thick, and therefore strong, enough at its thinnest wall portion to enable the article to withstand the normal filling line abuse and later handling in the service for which the article is intended. A smaller charge could be used if better glass distribution were effected in the forming process resulting in a saving of material and energy.

An attempt to avoid some of the problems discussed above would appear to have formed the basis for U.S. Pat. No. 1,840,532 dated Jan. 12, 1932, issued to C. E. Rowe. The general teaching of this patent was, in effect, that if the making of a bottle could be accomplished without forming a parison in a parison mold, then a lighter weight bottle could be produced. Whether this patent or the invention set forth therein ever became commercially significant or was ever actually practiced is not known to applicants. It is clear that the previously mentioned U.S. Pat. No. 1,911,119 issued to the same assignee, has become the forerunner of the presently successful and commercially important standard "I.S." glass forming machine. One complicating factor that was involved, in the preocess of Rowe, was the rotation of the charge of glass about the central axis of the neck mold, in order to attain some semblance of even distribution of the glass about the bubble that was being blown or formed therein. This would appear to be a closer approach to the hand-blowing techniques where the charge was rotated by the glass blower on the end of a punty while being expanded.

Some of the shortcomings and faults mentioned above are eliminated or their effect is minimized by the present invention which, it will be seen from the detailed description to follow, has some of the steps of the well-known, commonly practiced, "blow and blow" process of forming glassware, but will differ therefrom in important particulars.

It has been known that hand-blowing techniques for forming hollow objects from glass have been capable of producing thin walled articles having fairly uniform wall thickness. The hand-blowing technique, however, requires considerable skill and experience and in this day is a relatively unique talent not possessed by many glass producers and certainly would not be an economical method of producing glass containers of the type that are presently made by machines in large volume.

In addition to the foregoing description of published information respecting the well-known "blow and blow" process, a co-pending U.S. Patent application Ser. No. 775,131, filed Mar. 7, 1977, of common assignee, sets forth a glass forming process in which the "parison" is formed by a vacuum settle followed by the counterblowing of glass in the parison mold, with the formed parison having the thermal characteristic that in order to invert the parison, it is necessary to maintain a superatmospheric pressure within the parison.

SUMMARY OF THE INVENTION

The method and apparatus for forming glass containers by a process wherein a gob of glass is delivered to a parison mold and specially designed neck mold cavity. The gob is almost immediately settled in the neck mold about a low-heat removal plunger by vacuum. After the vacuum settle has been completed, the plunger is withdrawn and after a brief corkage reheat period, air under pressure is used to counterblow the charge in the parison mold to form a parison. The parison is then inverted and transferred from the parison mold to a final or blow mold where the parison is expanded into final article form. The special design of the neck-forming equipment permits the efficient use of vacuum to accomplish settling the glass in the neck-forming area and counterblow is effected sooner, resulting in a glass container of a selected volumetric capacity being formed with less glass and of a more uniform wall thickness and improved strength.

BRIEF DESCRIPTION OF THE DRAWINGS

FIG. 1 showing the charging of parison molds; FIG. 2, the removal of the funnel and settling of the charge in the mold by suction settle; FIG. 3, the seating of the baffles and corkage reheat and FIG. 4, the counterblowing of the charge in the parison or blank mold;

FIG. 6 is a top plan view of the neck ring half of FIG. 5 in conjunction with the other half to form a complete neck mold; and FIG. 7 is a schematic piping diagram of the vacuum and air supply system to the neck molds.

DETAILED DESCRIPTION OF THE DRAWINGS

The apparatus illustrated in the accompanying drawings will produce articles of glassware such as bottles and jars, in particular narrow-necked containers, which will have more uniform radial glass wall distribution when operated in accordance with the process hereinafter described in detail. The improved radial distribution permits substantial reduction in glass weight without loss in container strength.

It should be understood that the present invention is directed to an apparatus and process which may be practiced on what is termed the "I.S." machine in which the parison is formed in the parison mold in inverted position, neck down.

Figure 1:
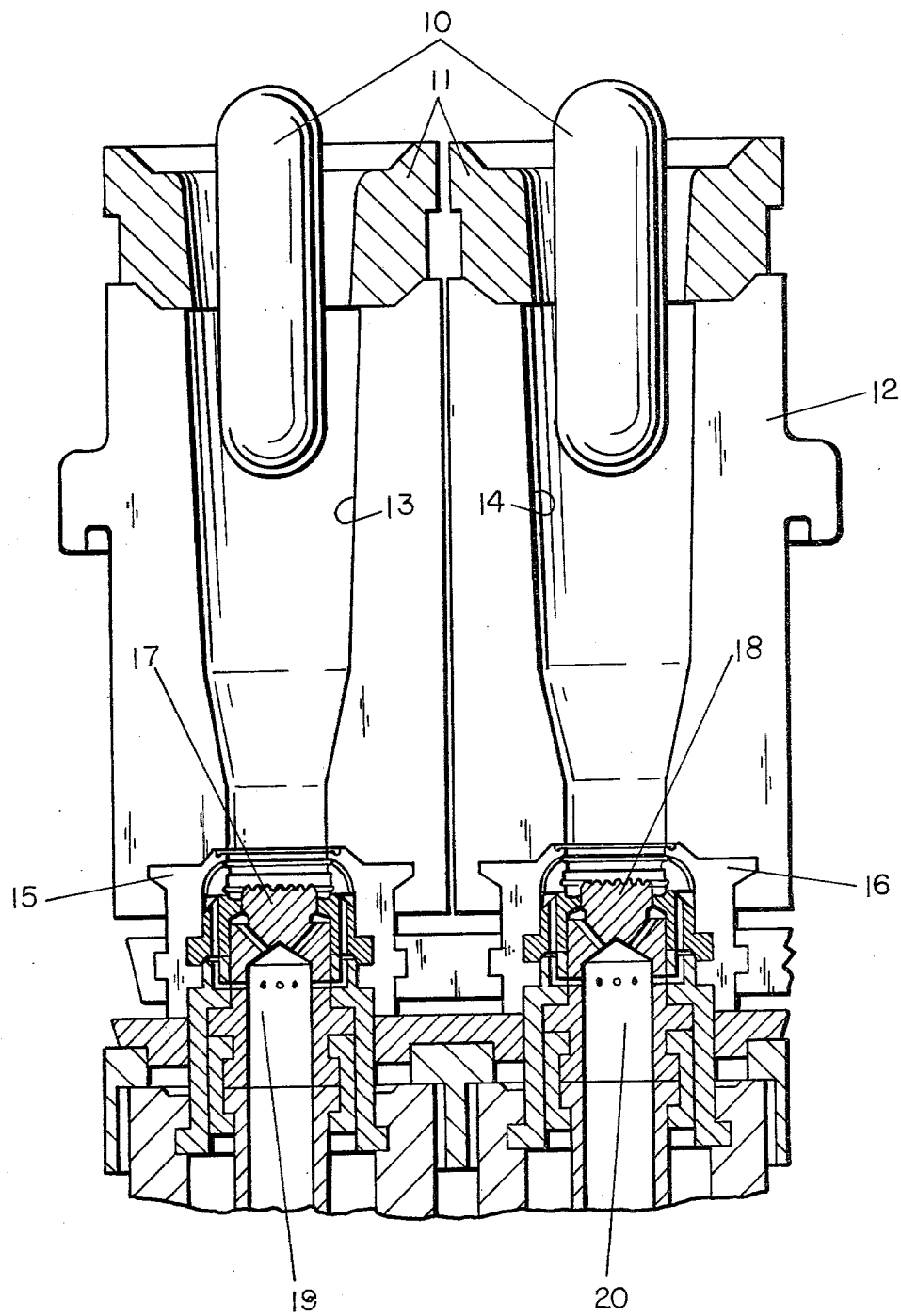
FIGS. 1–4 are somewhat schematic views, in vertical section, of apparatus and its mode of operation in forming glass articles such as parisons or preforms in accordance with the present invention.

In the present invention, it is significant that the charge of glass which is delivered to the mold will be settled within the mold by the application of vacuum thereto. As specifically shown in FIG. 1, the charges of gobs of glass 10 are falling through a pair of spaced funnels 11 which are seated upon a dual cavity parison mold 12. As specifically shown, the parison mold 12 is actually two, juxtaposed, single molds having cavities 13 and 14 therein. The parison mold 12, which will be referred to as a single mold, is shown in FIG. 1 as a two-piece mold, split in the vertical plane of the drawing, such that the faces of the cavity halves are being viewed. The molds 12 cooperate with a pair of neck molds 15 and 16. The neck molds 15 and 16 are also split and are shown in half section, it being understood that a complementary set of neck and body mold halves, when positioned together, form the complete mold cavities and neck cavities for the glass parisons to be formed. The neck mold 15, for example, will be described in greater detail with specific reference to FIG. 5, wherein the neck mold 15 is shown in enlarged detail.

Figure 2:
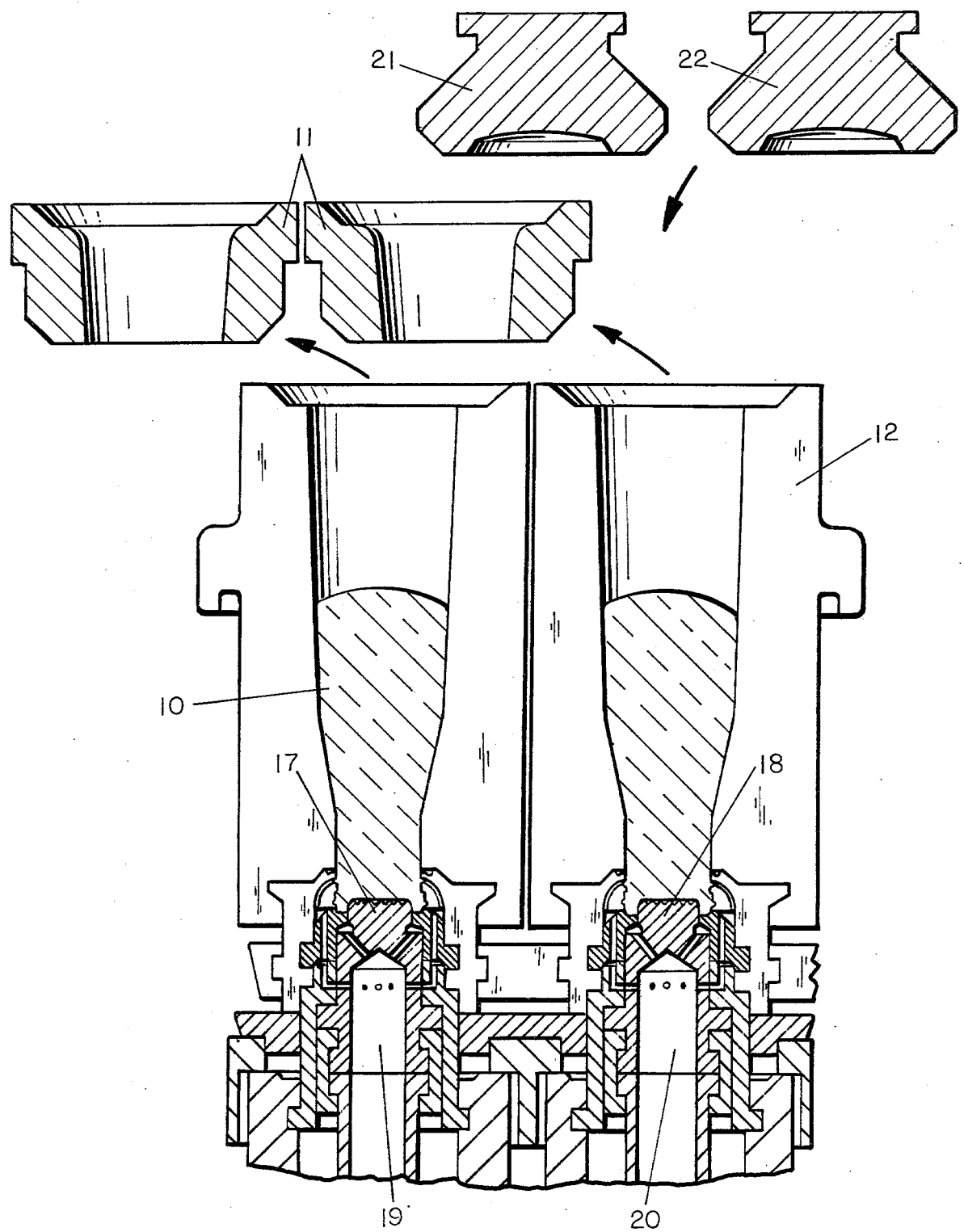

Positioned within the neck molds are plungers 17 and 18 which define at their lowest circumferential edges the inside finish portion of the container to be formed. In FIG. 1 it can be seen that the plungers 17 and 18 are in their uppermost position preparatory to the receipt of the gobs into the mold. In FIG. 2, the mold charges 10 have been settled around the plungers or neck pins 17 and 18 by the introduction of vacuum through central passages 19 and 20 which extend down into the generally conventional plunger cylinder operating mechanism, similar to that shown in U.S. Pat. No. 3,305,344. Once the charges 10 have, in effect, closed the cavities of the parison mold 12 or in a sense sealed the lower ends thereof, the vacuum may be triggered "on" and then, therefore, effectively form the "finish" portion of the container. During this interval, the funnels 11 are moved from the upper end of the parison mold 12 and a pair of baffle members 21 and 22 are seated upon the upper end of the parison mold 12 in the manner schematically shown in FIG. 3. After the finish is filled, the vacuum is turned off and the plungers 17 and 18 are retracted to the position shown in FIG. 3. After a period of time necessary to permit that area of the glass which was in contact with the plunger or neck pin to become sufficiently reheated, the introduction of the counterblow air is begun and the parisons will be blown into the shape illustrated in FIG. 4.

Figure 4:
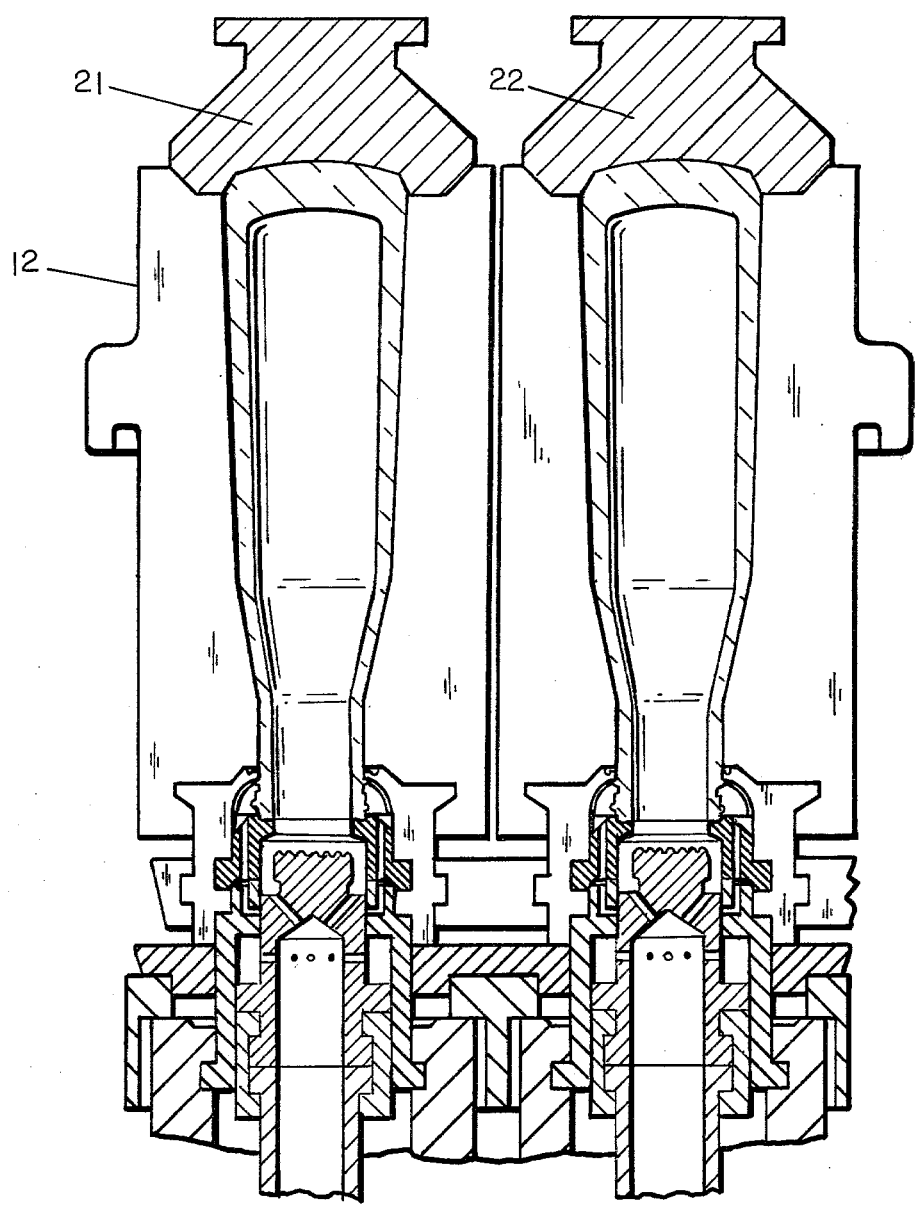

The remainder of the procedure following the formation of the parisons as shown in FIG. 4 is the normal sequence of events in the conventionl I.S. blow and blow process wherein the parisons are transferred by the neck molds and inverted to be placed within upright blow molds wherein the parisons are expanded into final bottle form.

Figure 5:
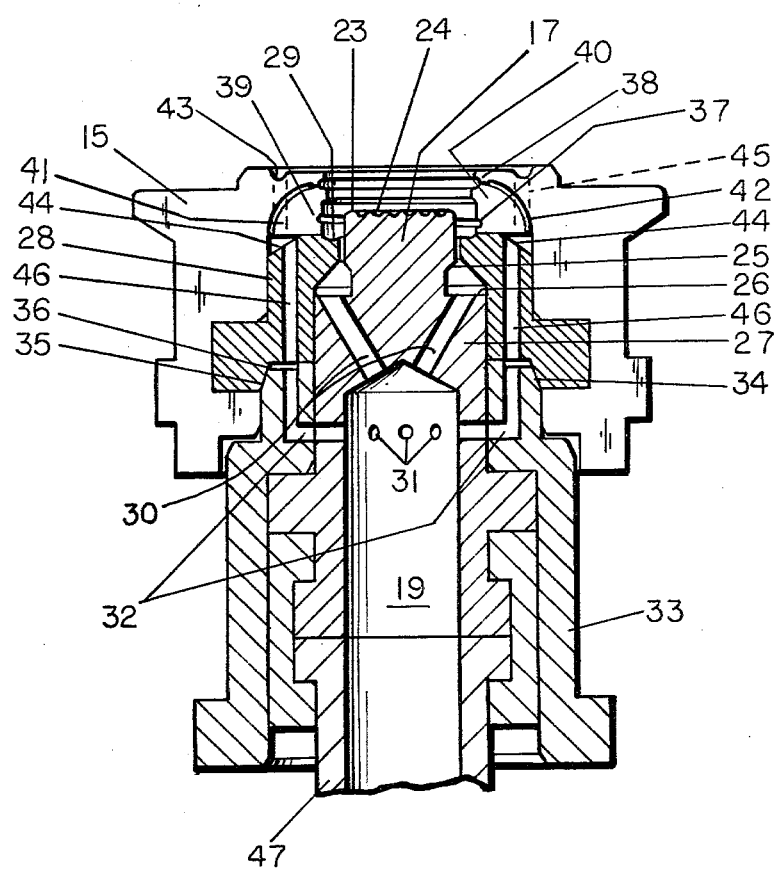
FIG. 5 is a vertical section of one of the neck rings and neck pins of FIG. 1 on an enlarged scale.

Turning now specifically to FIG. 5, details of the construction of the neck ring and plunger mechanism will be described, it being understood that the specifically shown neck ring or mold and plunger arrangement of FIG.5 is that appearing as the left-hand unit in FIGS. 1–4. In the particular arrangement shown in FIG. 5, the plunger 17 is in its elevated position and, as can be seen, the plunger has a generally horizontal top surface 23. The surface 23, as can best be seen in FIG. 6, is provided with a series of circular indentations 24, thus providing a generally "bull's eye" top view of the concentric rings formed by the pattern of the indentations 24. The circumference of the plunger 17 is generally cylindrical and extends downwardly to a point where it becomes relieved inwardly at 25. At the bottom of the relieved area 25, the plunger presents a horizontal face 26 which extends to an enlarged barrel portion 27.

The barrel portion 27 is positioned concentrically with respect to a guide ring 28. The upper end of the plunger 17 extends through a central opening in the guide ring 28 with relatively close clearance therebetween. The guide ring presents a generally rounded annular surface 29 which, in cooperation with the plunger 17, and the internal surface of the neck mold 15, defines the "finish" or neck of the container to be produced. The barrel portion 27 of the plunger has a plurality of angularly extending, circumferentially spaced, passages 30 formed therein which connect the passage 19 to the area immediately above the horizontal face 26 of the plunger 17. In addition to the passages 30, a plurality of horizontally extending passages 31 (in actual practice 16 in number) extend horizontally through the wall of the lower portion of the plunger 17. These passges 31 align with an equal number of passages 32 formed in a thimble 33 which surrounds and guides the plunger, and at its upper annular end 34 presents an inwardly tapered surface 35. The tapered surface 35 seats within a complementary tapered surface 36 formed at the lower inner circumference of the guide ring 28 and effectively isolates and seals the system interconnecting chambers as well as aligns the parts to provide guidance for the plunger.

The specific internal configuration of the neck mold carries a spiral, thread-forming groove 37 and a groove 38 which serves to form a bead around the neck or finish that will provide a support for the parison at the time the parison is enclosed within and suspended in the blow mold prior to the inflating of the parison.

In view of the fact that the present apparatus is to be used in the process wherein vacuum serves as the means by which the glass is settled around the neck pin and within the neck mold, diametrically opposed faces 39 and 40 of the neck mold are relieved, by milling to a depth sufficient to pass vacuum but not so large as to create a defect in the surface of the glass, in the one neck mold half only. A pair of chipped grooves 41 and 42 of greater depth than the relieved areas extend from within close proximity of the bead forming groove 38, in surrounding relationship to the surfaces 39 and 40 and provide an area through which vacuum will be applied along the face of the neck mold half 15. It should be understood that the opposite or complementary neck mold half will be made without comparable reliefs 39 and 40 and the chipped grooves 41 and 42. While it would be possible to divide the relieved portions between the two neck mold halves, this obviously would add to the expense in construction of the molds and sufficient relief and access to vacuum is provided by having the grooves formed in only one of the mold halves.

In addition to the above-mentioned grooves, a circular groove 43 surrounds the central cavity formed in the neck mold. This semi-annular groove 43 is in communication with an area 44 formed by the opening between the upper part of the guide ring 28 and the lower surface of the interior of the neck mold 15. Annular groove 43 is connected to the area 44 by a series of vertical passages 45. The guide ring 28 also is provided with a plurality of vertical passages 46. Thus when the source of vacuum is connected to the passage 19 centrally of the plunger 17, the area surrounding the areas at the sides of the neck-forming cavity will be evacuated through the passages 31, 32 and 46 via the chipped grooves 41, 42 and milled faces 39 and 40 of the neck ring. At the same time, the annular groove 43 will also be connected to the source of vacuum through the passages 45. The upper surface of both halves of the neck mold 15 are relieved in the area encompassed by the groove 43 sufficiently to provide a vacuum to the match line between the neck ring and the parison mold that is however small enough to avoid glass intrusion during vacuum settle. Thus the upper area surrounding the neck mold 15 is also subject to vacuum conditions when the vacuum is on.

Figure 3:
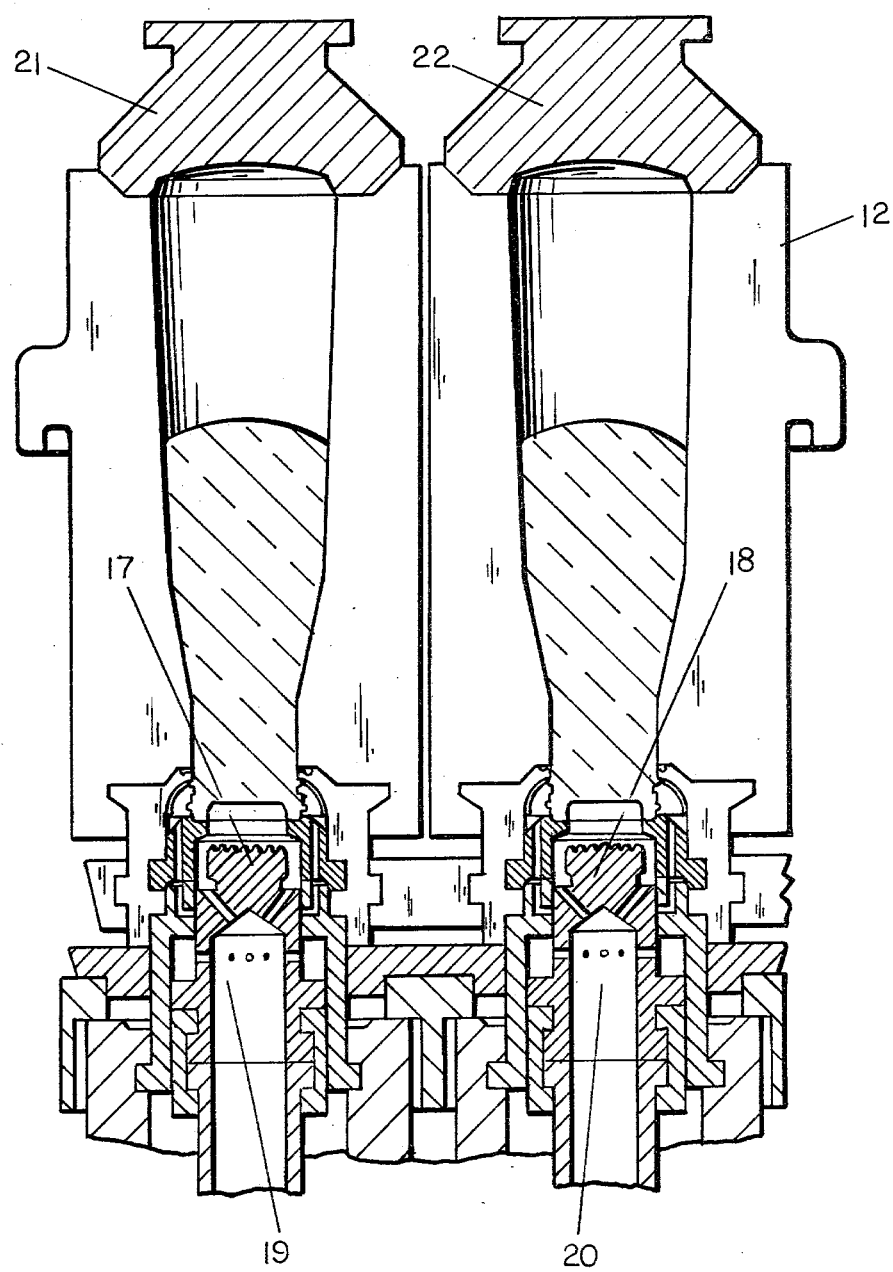

With the plunger in the position shown in FIG. 5, and with the application of vacuum to the passage 19, the glass will be drawn into and settled about the plunger 17 and within the confines of the cavity of the neck mold 15. The particular configuration of the plunger face 23, with the concentric grooves 24, will contact the molten glass at the time that the glass is drawn into the neck mold cavity, only at those raised portions. The glass will not be drawn into the bottom of the grooves 24 and only the limited contact area of the tops of the grooves will be chilling the glass. In this manner a less chilled surface is provided in the neck area, centrally of the parison. After retraction of the plunger 17 by downward movement of a tubular member 47 which is coupled to the plunger 17, and a short corkage reheat period, air under pressure may be connected to the interior of the passage 19 resulting in air under pressure passing through the passages 30 and into the area previously occupied by the upper end of the plunger 17. This application of air results in the counterblowing of the glass into the completed parison form as shown in FIG. 4. There is a period of time after withdrawal of the plunger 17 to the position as shown in FIG. 3, that the internal neck area of the glass which is contacted by the surface 23 of the plunger 17 is permitted to reheat and soften sufficiently to permit expansion into the full parison form of FIG. 4. However, by having the surface of the plunger with the configuration shown, a less severe chill will be formed on the neck area of the parison prior to counterblow. This period of time which is required to permit this area to reheat is termed "corkage reheat" in the art. In effect, the plunger 17 with the configuration shown may be termed "a hot tip plunger". It should be pointed out that the cylindrical side of the plunger does chill a portion of the inner glass finish area, which is necessary to maintain the inside glass dimensions of the finish.

With particular reference to FIG. 7, the cycle of operation of the mechanism will be explained, it being understood that the plunger cylinder will be moved up and down in the manner described in U.S. Pat. No. 3,305,344 and the connection to the passage 19 within the plunger body will be by way of a pipe connection 48. The passages 19 and 20 in the plungers extend downward centrally of the plunger cylinder mechanism in a manner similar to that shown in U.S. Pat. No. 3,305,344. It should be understood that both passages 19 and 20 in the double gob operation shown in FIGS. 1-4 may be commonly connected to the connecting pipe 48. Pipe 48 necessarily will provide a flexible connection since the plunger cylinder itself will reciprocate upwardly and downwardly an amount to provide the movement illustrated between the positions of the plunger in FIGS. 2 and 3. The other end of the connecting pipe 48 goes to a three-way vlave 49.

Body 50 of the valve 49 is spring-biased to the right and pressure operated to the left as viewed in FIG. 7. A vacuum header 51 is connected by a pipe 52 to the valve 49 and when the valve body 50 is shifted to the left by a pressure signal from a line 53, the vacuum header will be connected to the pipe connection 48. The signal through the line 53 is a pressure signal coming from a main glass forming machine valve block 54. Another line 55, extending from the machine valve block 54, will operate a second spring-biased spool valve 56. An air supply 57 is connected by a pipe 58 to a port of the valve 56. A second port of valve 56 is connected to an exhaust header 59.

In the particular configuration shown in FIG. 7, the line 48 which is connected to the plunger is shown as ultimately being connected to the exhaust header 59. Upon receipt of a signal through the line 55, the spool of valve 56 will shift to the left at which time the air supply 57 will be connected through the valve 56 and by way of a line 60, through the valve 49, to the pipe connection 48. In this way air under pressure for counterblow is connected to the interior 19 of the plunger mechanisms 17 and 18. Once the parison has been formed and the air supply signal from 55 is terminated, the parison may be transferred to the blow mold. After the parison is released to the blow mold, and prior to revert, the machine valve block may then provide a signal through the line 55 so that air under pressure from source 57 will be fed to the passages 19 and 20 of the raised plungers and will thereby exhaust through the passages in the vacuum valve 49 and thence to the passages formed in the plunger, including some of the passages through which vacuum normally is drawn. In this manner, an air purge is provided to the plunger mechanism by this system and clogging of the passages within the plunger is prevented, as well as avoidance of cooling of the neck ring which is still to be reverted from the blow station.

In addition to the foregoing details, as set forth with respect to the construction and function of the apparatus, it has been found advantageous that the cavities 13 and 14 formed in parison molds have their surfaces treated with a release and lubricating composition that has acquired the designation as being a "solid film lubricant". It is known that the gob of molten glass which is delivered to the parison mold may have an elevated surface temperature of 1600° to 1700° F. During the shaping of the glass in the forming process to the configuration shown in FIG. 4, the glass will typically cool to a temperature of between 1200° and 1300° F. This cooling, which naturally occurs die to the conduction of the heat into the molds, renders the surface of the glass parison more viscous and often will create an abrasive effect on the molding surface of the parison mold. In such molds, it has been the practice to apply various compositions or dopes containing silicons or oil dag and graphite compounds. These compounds, generally speaking, have been applied by spraying or mechanical swabbing during the forming operation so as to provide lubrication of the mold sections and to prevent sticking of the molten glass to the mold surfaces. As the surfaces become sticky the gobs fail to load down in the molds adjacent the neck pin, thus lubrication is essential to continued operation. As might be expected, since the glass molds are at an elevated temperature, any hydrocarbon materials are quickly evaporated. This creates a situation in a glass plant where the vaporized materials produce considerable volumes of smoke which will reduce visibility, have a noxious odor and result in condensation of the vapors in remote locations of the plant, which produce progressively worsening conditions as time passes.

The use of greater or lesser quantities of mold dope frequently is dictated by the inexpert observations and opinions of forming operators. When the mold lubricant is sprayed, it is usually under a timed sequence or mechanical sequence related to machine speed and, therefore, is regularly repeated and may create an unsafe environment for the machine operators. A number of aqueous systems have also been used with various degrees of success. These applications of mold dope have led to attempts to provide more permanent types of coatings to the mold cavities, and in the particular environment of the present invention, where vacuum is used to settle the charge of glass in the parison mold, a significant consideration is that as little extraneous material as possible be placed within the mold when the mold is in operation. As can readily be seen, mold dope in liquid or spray form most likely would clog passages and this would have deleterious effects with regard to the functioning of vacuum systems. It would also be expected that any vaporization of mold dope just prior to loading of the gobs might entrap some of the mold dope vapor which would then be drawn through the vacuum system when the vacuum is applied to the finish area of the neck molds. Thus the serious drawbacks with respect to the use of lubricants other than those which are termed "solid film lubricants" is apparent. While the apparatus of the invention may operate without the use of solid film lubricants, it can be readily appreciated that more frequent cleaning or changing of mold equipment will be necessary to keep the system operating at the speeds necessary to provide a truly economical process for the production of glassware.

Solid film lubricants used may be of the general type disclosed in U.S. Pat. No. 3,874,862 issued to A. L. Bickling, Jr., et al., or as described in Czechoslovakian Pat. No. 128236 issued in the names of Z. Faix and J. Kratochvil. The Czechoslovakian patent, in particular, teaches the use of a solution consisting of 10-70 parts of an organic silicon resin bonding 8-20 parts heat resistant lubricating pigment material such as graphite or molybdenum sulfite. The properties of this lubricant make it possible, according to the various conditions and requirements, to vary the addition of catalytic metallic salt of naphthenic acid (up to 10 parts) and an asbestos addition (up to 25 parts) in various sulfide mixtures. Utilization of an aqueous methyl silicon oil emulsion with colloidal graphite provides an improved lubricating mixture.

In the process of the invention, it can be seen that the provision of molds having solid film lubricant coatings formed therein provide relatively long life operation without swabbing or spraying of mold dope except possibly at infrequent intervals.

With reference to FIGS. 1-4, and as previously explained, the cycle of operation of the process is first the charging of the mold 12 with gobs 10 through the funnels. After the charges have, in effect, sealed a section of the neck area of the parison mold volume, the vacuum is triggered "on" resulting in vacuum settling the glass about the neck pins. When comparing the cycle of the present process with the conventional "blow and blow" process in which the charge of glass is settled in the parison mold by the application of air under pressure above the charge of glass, the vacuum fill of the present invention may be begun as soon as the gob loaded in the mold effectively seals the chamber. Vacuum fill may be completed in approximately 0.25-0.35 seconds. Counterblow may be begun after the period for corkage reheat. Counterblow may then be accomplished in the remaining time provided in the parison forming cycle of the I.S. machine. By rapidly working the glass gob through the early, critical, stages of parison formation, it has been found that it is possible to produce parisons having the desired, precise thermal history so as to be capable of expansion to even wall thicknesses throughout the final container. This results in the minimization of unwanted glass material chill periods which are inherent in the I.S. blow and blow process as set forth in U.S. Pat. No. 1,911,119.

The present system provides for improved glass distribution, improved quality, more durable containers and has the potential for producing even lighter weight ware and consequent potential for speed increases in the forming cycle. The utilization of vacuum to fill and seat the glass about the plunger, in place of the conventional settle blow air pressure, eliminates the mechanical delay time between gob load and finish fill and minimizes the chilling of the gob blank contact surface by only having atmospheric pressure acting upon it during the finish fill process. The quick finish fill action reduces pressure chill and a plunger designed for minimum heat removal permits an early application of counterblow air which results in a reduction of any settle wave defect and improves the general glass distribution in the blown container. It should be remembered that any leakage of air into the vacuum chamber deteriorates its effectiveness and, therefore, the gob should be in the blank mold sealing off the external air before the vacuum is applied and all of the mold parts making up the vacuum chamber should be closed tight, sealing off the chamber from external air.

We claim:
1. Apparatus for forming glass parisons comprising:
an annular neck mold formed of two matching halves positioned beneath said parison mold in axial alignment therewith;
a plunger having a relatively flat, horizontal face positioned axially within said neck mold, said plunger having its horizontal face provided with shallow, concentric grooves;

face relief means formed in one neck mold half at the interface of the parting line between said neck mold halves in the area of the thread-forming portion of the neck mold halves;

an annular guide ring mounted in said neck mold for guiding the neck pin;

a retractable thimble having its upper end sealingly engageable with said guide ring;

passage means extending upwardly through said guide ring and thimble at circumferentially spaced points;

a source of vacuum; and means connecting said vacuum to said thimble, said vacuum being in communication with said guide ring for applying a vacuum to the face relief area of said neck mold.

2. The apparatus of claim 1, further including an annular, semi-cylindrical channel formed in the top of said neck mold;

a plurality of vertical passageways formed in said neck mold, and connecting said semi-cylindrical channel with the vacuum passages in said guide ring whereby an evacuated zone surrounds the upper annular opening of the neck mold.

3. The apparatus of claim 1, further comprising means on said thimble and said guide ring for sealing the juncture thereof against passage of air out of the path therethrough.

4. The apparatus of claim 1, further including passage means in said plunger and wherein said vacuum is connected to the interior of said plunger, and the interior of said plunger is provided with radially extending passages in communication with the passages in the thimble when the plunger is in its extended position.

5. The apparatus of claim 4, further including valve means connected between said source of vacuum and said plunger; and means for operating said valve in proper sequence, said valve sequentially passing vacuum, air under pressure or exhausting air from the plunger.

6. The method of forming lightweight glass containers comprising the steps of:

positioning a one-piece plunger or neck pin having a generally horizontal, grooved surface coaxially within the neck mold of an inverted parison mold, neck mold combination;

forming a charge of molten glass;

loading the charge into the closed, inverted parison mold, neck mold and central plunger combination;

applying a vacuum to the neck mold after sealing of the mold cavity by the charge of glass to thereby settle the charge into close contact with the plunger and neck mold;

withdrawing the plunger from the neck mold without removing substantial heat from the glass charge while closing the upper end of the parison mold with a baffle;

applying a counterblow air to the interior of the charge past the withdrawn plunger;

continuing counterblow application for a time sufficient to complete counterblow of the charge into a parison defined by the interior of the parison mold and the baffle;

opening the parison mold and removing the baffle therefrom;

transferring the parison by inverting the neck mold from the parison mold position to a blow mold;

injecting counterblow air through the vacuum passages to the plunger to purge them;

reverting the neck mold after release of the parison at the blow mold; and repositioning the plunger, neck mold and parison mold into charge-receiving position.

* * * * *